US 6,538,692 B2

(12) United States Patent
Niwa

(10) Patent No.: US 6,538,692 B2
(45) Date of Patent: *Mar. 25, 2003

(54) DYNAMIC DATA STORAGE CONTROL METHOD AND SYSTEM

(75) Inventor: Mayumi Niwa, Tokyo (JP)

(73) Assignee: Sanyo Electric Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,333

(22) Filed: Dec. 4, 1997

(65) Prior Publication Data

US 2001/0022620 A1 Sep. 20, 2001

(30) Foreign Application Priority Data

Dec. 6, 1996 (JP) ............................................. 8-326602

(51) Int. Cl.[7] ............................ H04N 5/76; H04N 5/228
(52) U.S. Cl. ................................. 348/231.1; 348/231.6; 348/231.9; 386/117
(58) Field of Search ....................... 386/46, 52; 369/32, 369/48; 358/906, 909.1; 396/310, 312, 321; 348/207, 222, 231, 232, 233, 239, 552; H04N 5/76, 7/00

(56) References Cited

U.S. PATENT DOCUMENTS

| | | | | | |
|---|---|---|---|---|---|
| 5,440,685 | A | * | 8/1995 | Takiyama | 345/536 |
| 5,581,311 | A | * | 12/1996 | Kuroiwa | 348/233 |
| 5,648,816 | A | * | 7/1997 | Wakui | 348/233 |
| 5,682,202 | A | * | 10/1997 | Watanabe | 348/231 |
| 5,852,467 | A | * | 12/1998 | Ogino | 348/231 |
| 5,867,214 | A | * | 2/1999 | Anderson | 348/231 |
| 5,956,084 | A | * | 9/1999 | Moronaga | 348/233 |
| 6,020,982 | A | * | 2/2000 | Yamauchi | 358/909.1 |

* cited by examiner

Primary Examiner—Ngoc-Yen Vu
(74) Attorney, Agent, or Firm—Hogan & Hartson, LLP

(57) ABSTRACT

Image data coded by a variable length coding module is output to an external R/W controller and an internal R/W controller. A determination module compares the amount of coded picture data to be recorded next with the amount of free space on an external recording medium. If there is enough free space, image data is written on the external recording medium. If free space is insufficient, subsequent image data is written into an internal memory. When image data is coded into variable length data, it is difficult to predict precisely a recording time of the external recording medium, which means that the external recording medium may become full before a desired amount of image data is recorded. However, image recording may be continued using the internal memory even after the external recording medium becomes full.

8 Claims, 6 Drawing Sheets

DYNAMIC DATA STORAGE CONTROL METHOD AND SYSTEM

BACKGROUND OF THE INVENTION

1. Field of the Invention

The present invention relates to a data storage control method and system, and more particularly to a method and a system which controls writing of image data to a storage medium. The present invention also relates to a data storage system with the above control function.

2. Description of the Related Art

Technology for compressing and coding moving image data and storing it on various types of storage media is evolving. One of typical technology is MPEG. Today, many manufacturers are developing multimedia units and trying to market MPEG-conforming products.

FIG. 1 shows an outline configuration of an MPEG-conforming image recording system with a CCD camera 2. This image recording system has a compression module 4, a variable length coding module 6, and an image recording control system 8. The compression module 4 performs Discrete Cosine Transformation (hereafter called DCT) on video input data and then quantizes the transformed data. The compression module 4 also compresses data through motion compensation. The variable length coding module 6 uses a probability method to code in the variable length mode the data that has been quantized (hereafter called quantized data) so that the amount of coded data is minimized. The image recording control system 8 has an external medium read/write controller (hereafter called an R/W controller) 10 which controls reading coded of data from and writing of coded data to, an external recording medium 12.

In this configuration, video signals generated by the CCD camera 2 are sent to the compression module 4. The compression module 4 disassembles the video signals into discrete space frequency components, one macro block at a time, each macro block being composed of a plurality of picture elements (pixels) of a picture; the module then quantizes the signals into a specified number of levels. The variable length coding module 6 codes the quantized data and generates MPEG coded data streams. An external R/W controller writes the streams on an external recording medium 12.

When image data is coded into variable length data by the above image recording system, how much image data is recorded in terms of time depends on the type of image data to be recorded (this length of time is referred to as a recording time). The amount of coded data depends on the type of data. Therefore, the recording medium sometimes becomes full before all the image data is recorded, in which case image recording is ended prematurely. This means that, if an image recording system user does not know a recording time, he or she has sometimes image recording interrupted and therefore cannot record all desired image data successfully.

No efficient method has been developed for predicting how long a user may continue recording on a current medium. Even if the user can predict the remaining recording time of the current medium, the actual recording time depends on some other factors such as the type of image data which will be recorded. Even when the predicted remaining recording time is shorter than the actual recording time, it is desirable that recording be continued without interruption.

Another solution is to extend a recording time by controlling the amount of code. A disadvantage to this solution is that a less amount of code degrades the quality of decoded image data.

The above problem is not limited to image data recording. The problem also applies when other types of data, such as voice data, are recorded on an external storage medium.

SUMMARY OF THE INVENTION

The present invention seeks to solve the problems associated with a prior art described above. It is an object of the present invention to provide a data storage control method and system that prevent a situation in which recording is interrupted because an external medium becomes full before all intended data is recorded. It is another object of the present invention to provide a data storage system with the function described above.

(1) A data storage control method according to the present invention is a method for controlling storage of data on a removable external recording medium which can be installed on a storage system, comprising the steps of stopping storing data on the external recording medium when judgment is made not to store data on the external recording medium and, at the same time, storing data, which follows data stored on the external recording medium, in an internal storage means.

Preferably, data to be processed by this method is image data, voice data, and so forth. As will be described later, the method according to the present invention is applicable to the recording of still image data and moving image data. An external recording medium, a unit separate from an image recording system, may be exchanged as necessary. This external recording medium may be an IC card, floppy disk, CD-ROM, or magnetic tape, or the like. The external recording medium is an electrically-, magnetically-, or optically-accessible medium. So is the internal storage mean; a semiconductor memory is used as necessary.

For example, judgment "not to store data on the external recording medium" may be made when the amount of data on the external recording medium has reached a predetermined amount. The predetermined amount should preferably be set to the size of the data storage area on the external recording medium or to a value close to it.

When judgment is made in this configuration that no more data should be stored on the external recording medium, data which follows data stored on the external recording medium is held in the internal storage means to allow all desired data to be recorded without interruption.

While data is being stored on the external recording medium in the system according to the present invention (that is, during usual recording time), one of the following two types of processing may be performed on the internal storage means. During usual recording time, (A) data is not stored in the internal storage means, and (B) data is stored and updated in the internal storage means.

A method according to the present invention in which (A) described above is performed is a method for controlling storage of data which comprises steps of comparing an amount of free space on the external recording medium with an amount of data to be stored next; storing data on the external recording medium if the amount of free space is larger than the amount of data; and storing data in the internal storage means if the amount of free space is insufficient. After the data destination is changed, data is stored in the internal storage means. In this case, the time when "the free space is insufficient" corresponds to the time when "judgment is made that no more data should be stored on the external recording medium which is separate from the system" described above.

For example, the amount of image data coded into variable length data is variable. Therefore, in the above configuration, the comparison between amount of data to be stored next with the amount of free space depends on the amount of data.

A method according to the present invention in which (B) described above is performed is a method for controlling storage of data, wherein data in the internal storage means is updated by sequentially-entered data and wherein, when the amount of data stored on the external recording medium has reached a predetermined amount, data which follows data stored on the external recording medium is held in the internal storage means.

The time "when the amount of data stored on the external recording medium has reached a predetermined amount" corresponds to the time when "judgment is made that no more data should be stored on the external recording medium" described above. In this case, the "predetermined amount" may be the maximum size of the space available for storing desired data or an amount smaller than but close to the maximum. As described above, a module for comparing the amount of free space with the amount of data to be stored next may be added to this configuration. The "predetermined amount" described above may vary according to the data to be stored.

In this aspect, (a) data may be stored on the external recording medium and in the internal storage means concurrently, and data stored in the internal storage means may be updated during usual recording time. (b) Data may be sent to the internal storage means first, and then data may be sent from the internal storage means to the external recording medium. (c) Conversely, data may be sent to the external recording medium first, and then data may be sent from the external recording medium to the internal storage means.

Preferably, when a first external recording medium is changed to a second external recording medium, data stored in the internal storage means is stored on the second external recording medium.

(2) Another aspect of the present invention is a method for controlling storage of data on a removable external recording medium which can be installed on a storage system wherein, when the external recording medium is removed, data which follows data stored on the external recording medium is held in an internal storage means and, preferably, wherein, when a second external recording medium is installed, data which is held in the internal storage means and which is entered after a first external recording medium is removed is stored in the second external recording medium.

This configuration is preferable for a case in which the external recording medium is removed before judgment is made not to store data on it, for example, when it becomes 50% full. In such a case, this configuration allows the user to continue recording while exchanging the external recording medium. Simply installing a new external recording medium moves data from the internal storage means to the installed external medium, thereby allowing data to be recorded seamlessly across medium exchange.

A method used in this configuration may be a method wherein data in the internal storage means is updated by sequentially-entered data and wherein, when the amount of data stored on the external recording medium has reached a predetermined amount, data which follows data stored on the external recording medium is held in the internal storage means.

(3) A data storage control system according to the present invention comprises an external storage controller which stores data on a removable external recording medium which can be installed on a storage system; an internal storage controller which stores data in internal storage means on an auxiliary basis; and a main controller which controls the external storage controller and the internal storage controller, the main controller stopping writing data on the external recording medium and holding data, which follows data stored on the external recording medium, in the internal storage means when judgment is made not to store data on the external recording medium. In this configuration, the image recording control method described above is implemented as a system.

(4) A data storage system according to the present invention comprises an encoder for coding entered data into variable length data; an external storage controller which stores data on a removable external recording medium which can be installed on said storage system; an internal storage controller which stores data in internal storage means on an auxiliary basis; and a main controller which controls the external storage controller and the internal storage controller, the main controller stopping writing data on the external recording medium and holding data, which follows data stored on the external recording medium, in the internal storage means when judgment is made not to store data on the external recording medium.

Preferably, the main controller has a comparator which compares an amount of free space on the external recording medium with an amount of data to be stored next; wherein the main controller stores data on the external recording medium if the amount of free space is larger than the amount of data; and wherein the main controller stores data in the internal storage means if the mount of free space is insufficient.

For example, when image data is coded into variable length data, the amount of code generated in a short period of time is variable. This means that the amount of image data (for example, the number of pictures of image data or the recording time of moving image data) is variable. In such a case, the system according to the present invention prevents a situation in which a desired image data is not recorded just because the amount of data cannot be predicted precisely in advance. Therefore, the present invention is applicable to a data storage system which contains a variable amount of data, for example, an image recording system which codes data into variable length data.

In most cases, a configuration such as the one used by the present invention does not have a large-capacity internal storage means. With this in mind, the system may be configured so that data is written into the internal storage means at a fixed, low rate to allow more data to be stored there. To do so, there are two sample configurations. (a) In one sample configuration, when judgment is made not to store data on the external recording medium, the data coder generates a smaller amount of coded data for transmission to the internal storage means. (b) In another sample configuration, there is provided a data generating means which always generate a small amount of data and this data is used to update data in the internal storage means. When judgment is made not to store data on the external storage medium, data which follows data stored on the external recording medium is held in the internal storage means.

DESCRIPTION OF PREFERRED EMBODIMENTS

Figure 1:
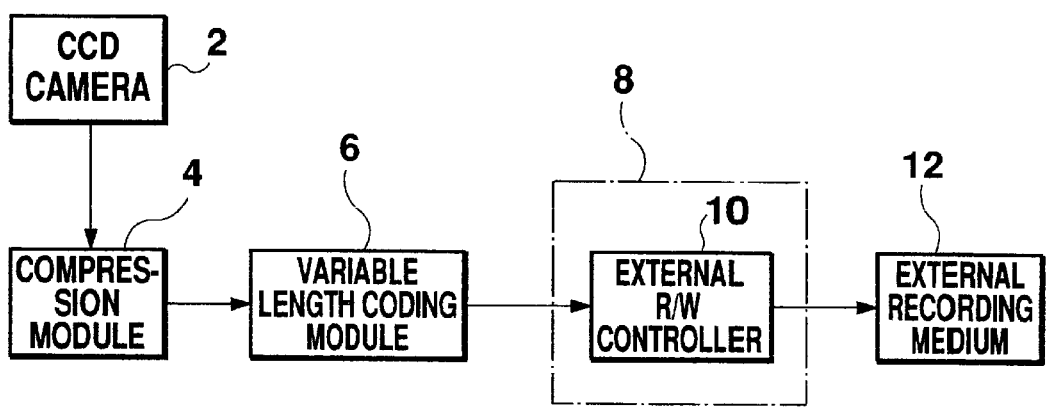
FIG. 1 is a diagram showing the configuration of a conventional image recording system.

An embodiment of the present invention is described with reference to the drawings. In the embodiment described below, the present invention applies to an image recording system with the CCD camera 2 shown in FIG. 1. In the following discussion, image data (including quantized data and coded data) refers to the data of a picture.

Embodiment 1

Figure 2:
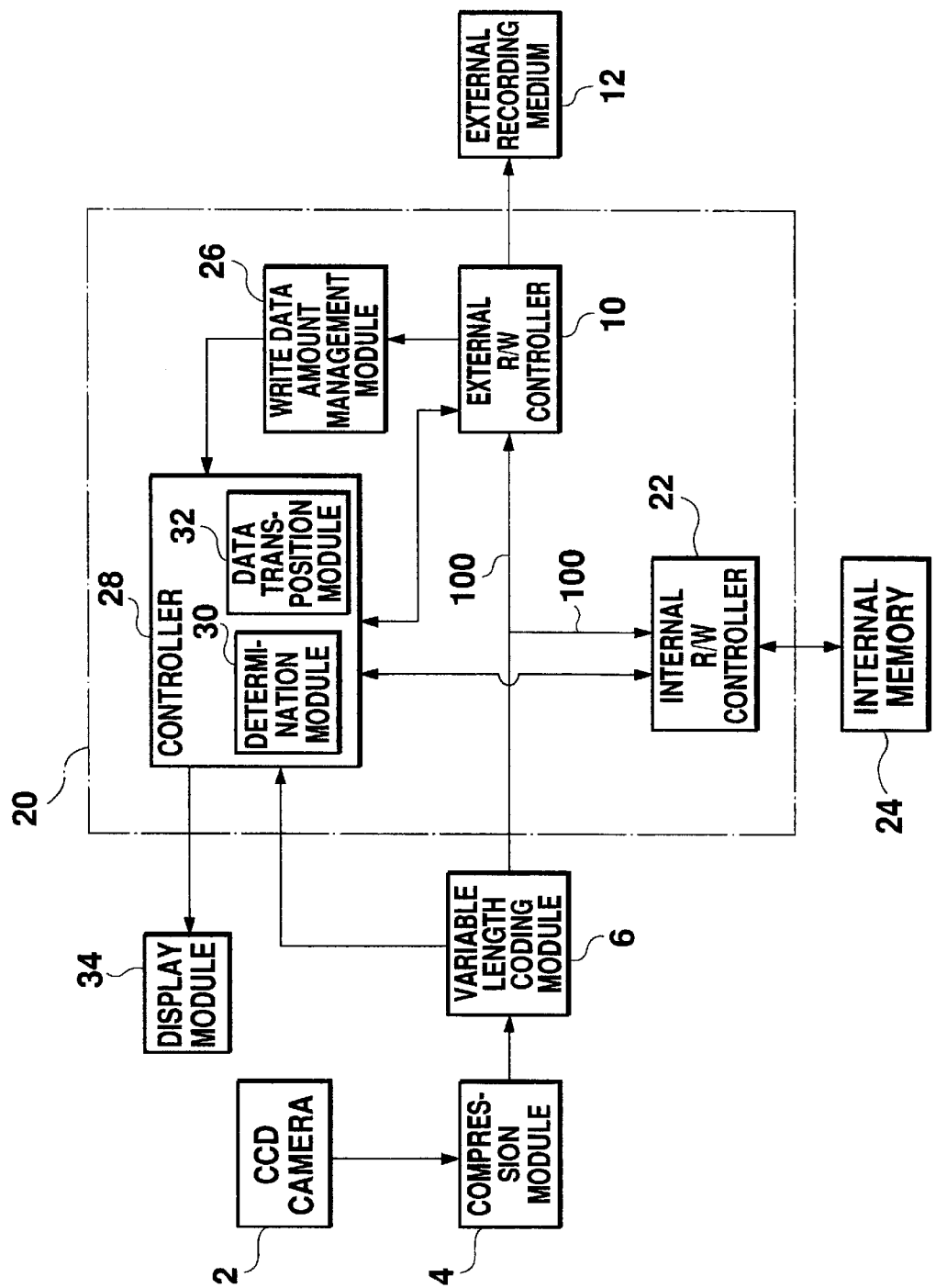
FIG. 2 is a diagram showing the configuration of an image recording system of a first embodiment.

FIG. 2 shows the configuration of an image recording system with an image recording controller 20. The same numbers are used for components in FIG. 2 corresponding to those in FIG. 1. The following description focuses on differences between these components and those described and shown in FIG. 1.

In addition to an external R/W controller 10, the image recording controller 20 has an internal memory read/write controller 22 (hereafter called an internal R/W controller). Coded data 100 generated by a variable length coding module 6 is sent to the external R/W controller 10 and to the internal R/W controller 22. The internal R/W controller 22 controls the writing and reading of coded data to or from an internal memory 24 contained in the image recording system. This internal memory 24 functions as an image data temporary buffer when the external recording medium 12 becomes full. The size of the internal memory 24 may be set according to the system size; for example, the internal memory 24 may contain scores of seconds or several minutes of moving image data.

The external R/W controller 10 has a medium state flag, which is set when the external recording medium 12 is exchanged. Similarly, the internal R/W controller 22 has a memory state flag, which is on when the internal memory 24 contains coded data.

The image recording controller 20 also has a write data amount management module 26. The write data amount management module 26 receives data from the external R/W controller 10 and determines the amount of free space on medium, that is, how much data the external medium is able to accept now.

In addition, the image recording controller 20 has a controller 28 which controls the external R/W controller 10 and the internal R/W controller 22. A determination module 30 contained in the controller 28 receives two types of data: data on the amount of free space on the medium from the write data amount management module 26, and data on the amount of coded picture data to be recorded next from the variable length coding module 6. The determination module 30 compares the amount of free space on the medium with the amount of coding and, based on the comparison result, outputs the following control signals to the external R/W controller 10 and the internal R/W controller 22.

(1) When the amount of coded picture data to be recorded next is less than the amount of free space on the medium (usual recording time):

The determination module 30 outputs the "write enable signal" to the external R/W controller 10, and the "write disable signal" to the internal R/W controller 22. In response to the signal, the external R/W controller 10 writes the received coded data to the external recording medium 12 while the internal R/W controller 22 does not write the coded data into the internal memory 24.

(2) When the amount of coded picture data to be recorded next is larger than the amount of free space on the medium:

The determination module 30 outputs the write disable signal to the external R/W controller 10, and the write enable signal to the internal R/W controller 22. Upon receiving the signal, the external R/W controller 10 does not write the received coded data to the external recording medium 12 while the internal R/W controller 22 writes the coded data into the internal memory 24.

A data transposition module 32 contained in the controller 28 references the medium state flag in the external R/W controller 10 and the memory state flag in the internal R/W controller 22. When two conditions, (1) the external recording medium 12 has been exchanged and (2) the internal memory 24 contains coded data at exchange time, are satisfied, the data transposition module 32 outputs a "transposition signal" to the external R/W controller 10 and to the internal R/W controller 22. Upon receiving the signal, the internal R/W controller 22 reads coded data from the internal memory 24 and sends it to the external R/W controller 10. The external R/W controller 10 writes the received coded data on the external recording medium 12.

As shown in FIG. 2, the image recording system also has a display module 34. The display module 34, upon receiving from the controller 28 information indicating that coded data is being written into the internal memory 24, displays a message indicating that the external recording medium 12 is full.

The system with the above configuration operates as follows:

As described above, video signals generated by the CCD camera 2 are converted to quantized data by the compression module 4 one piece of picture data at a time, and coded into variable-length data by the variable length coding module 6. The variable length coding module 6 sends coded data to the external R/W controller 10 and to the internal R/W controller 22 and, at the same time, sends information on the amount of the coded data to the determination module 30. The determination module 30 compares the amount of coded data with the amount of free space on the external recording medium 12.

If the amount of free space on the external recording medium 12 is larger than the amount of coded picture data to be recorded next, the coded picture data may be recorded on the external recording medium 12. Then, the determination module 30 outputs the write enable signal to the external R/W controller 10, and the write disable signal to the internal R/W controller 22. These signals make it possible coded data to be written on the external recording medium 12 provided a sufficient amount of space is available.

As more coded data is written on the external recording medium 12, space available on the external medium is reduced and, eventually, the available space on the external recording medium 12 becomes less than the amount of coded picture data to be recorded next. At this time, the determination module 30 sends the write disable signal to the external R/W controller 10, and the write enable signal to the internal R/W controller 22. The determination module 30 sends these control signals each time it detects such a condition. These signals prevent coded picture data from being written on the external recording medium 12 and cause it to be written into the internal memory 24. Coded picture data is written into the internal memory 24 until a user issues a stop instruction or until the internal memory 24 becomes full. While data is being written into the internal memory 24, a message remains displayed on the display module 34 to let the user know the condition.

When the user exchanges the external recording medium 12 as instructed by the message displayed on the display module 34, the image recording controller 20 operates as follows:

(1) When Image Recording is Stopped Before Exchanging a Medium:

The data transposition module 32 references the medium state flag in the external R/W controller 10 and understands that the medium is going to be exchanged; it also checks the memory state flag in the internal R/W controller 22 to understand that coded data is stored in the internal memory 24. The data transposition module 32 then sends the transposition signal to the external R/W controller 10 and the image recording controller 20. This signal causes the internal R/W controller 22 to read coded data from the internal memory 24, and the external R/W controller 10 to send it to the external recording medium 12. This signal also resets the flags. (2) When Image Recording is Continued Across Medium Exchange:

The user exchanges the medium without stopping shooting. In this case, coded data is written into the internal memory 24 until the medium is exchanged successfully. When the user finishes exchanging the medium, the determination module 30 references the medium state flag. It then sends the write enable signal to the external R/W controller 10, and the write disable signal to the internal R/W controller 22. These signals cause coded data generated after exchanging the medium to be written on the external recording medium 12. This is a usual operation described above. While image data generated after exchanging the medium is being written on the external recording medium 12, the data transposition module 32 does not output the transposition signal.

A shooting stop instruction from the user stops writing coded data, generated after medium exchange, onto the external recording medium 12. As in (1), the data transposition module 32 checks the medium state flag and the memory state flag to output the transposition signal. Then, coded data is read from the internal memory 24 and written on the external recording medium 12.

Figure 3:
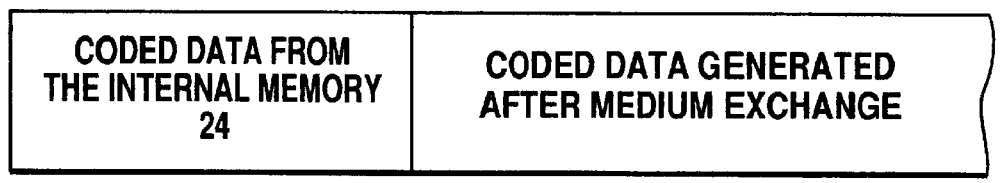
FIG. 3 is a diagram showing image data recording areas allocated on an external recording medium.

FIG. 3 shows how image data is written on the external recording medium 12 across medium exchange. As shown in the figure, image data from the internal memory 24 precedes image data generated after medium exchange.

A variation of the continued recording mode described in (2) is as follows. Immediately after the medium is exchanged, the data transposition module 32 sends the transposition signal to the external R/W controller 10 and the internal R/W controller 22. These signals cause the internal R/W controller 22 to read data from the internal memory 24, and the external R/W controller 10 to write it on the external recording medium 12. Coded data from external video signals generated after the medium 12 is exchanged is then written on the external recording medium 12. At this time, the external R/W controller 10 writes coded data faster than data is coded.

Figure 4:
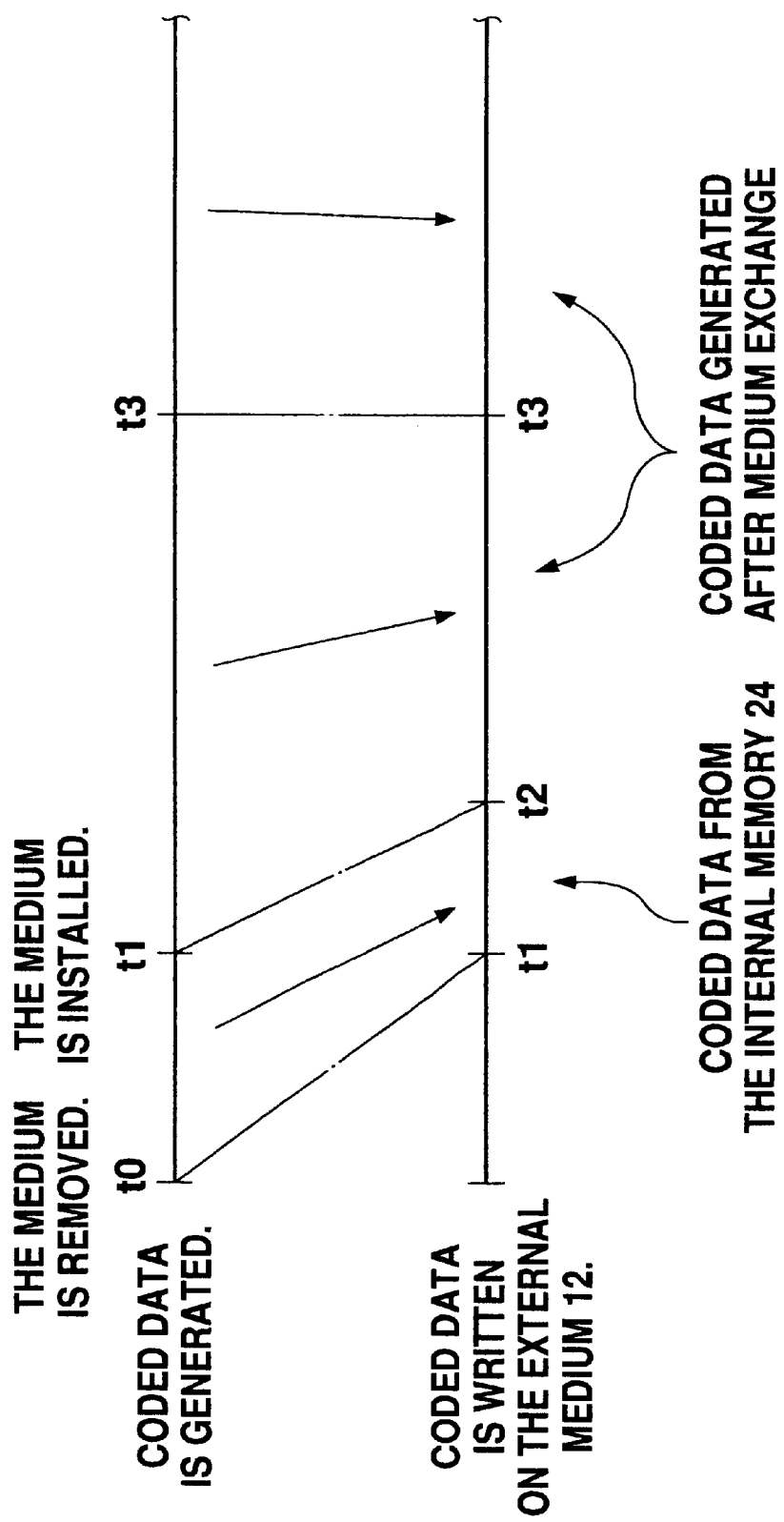
FIG. 4 is a timing chart showing how coded data is written on the external recording medium when the medium is exchanged.

FIG. 4 shows the order in which data is written on the external recording medium 12. The top line shows the generation of coded data, while the bottom line shows the writing of coded data on the external recording medium 12. The External recording medium 12 is removed at point t0 and an another medium is installed at point t1. Coded data generated from point t0 to point t1 is written in the internal memory 24. The data is transposed on the external recording medium 12 from point t1 to point t2. On the other hand, coded data generated after point t1 is written on the external recording medium 12 after point t2. After the external recording medium 12 is changed (t1), coded data stored in the internal memory 24 is written onto the external recording medium 12 faster than the new data is coded. Therefore, the distance between point t1 and t2 is shorter than the distance between point t0 and t1. Data generated between point t1 and point t3 (top line in FIG. 4) is recorded between point t2 and t3 (bottom line in FIG. 4). Thus, writing on the external recording medium 12 catches up with coded data generation. After point t3, the writing speed is reduced to the original speed, and coded data is written immediately after generated. To implement this configuration, a buffer may be provided to temporarily store image data generated immediately after medium exchange.

The image recording controller 20 also performs the following processing. In this explanation, it is assumed that the user removes the medium before it becomes full without stopping shooting. For example, the user exchanges the medium when it is 80% full. Information indicating that the medium is removed is sent to the determination module 30 from a controller (not shown) controlling the whole image recording system (or the external R/W controller 10). The determination module 30 which receives this information outputs the write enable signal to the internal R/W controller 22 to write coded data into the internal memory 24. Subsequent processing is the same as for the processing performed when the medium is exchanged. That is, when the external recording medium 12 is installed, the data transposition module 32 issues the data transposition signal which causes the internal R/W controller 22 to read coded data from the internal memory 24 and then the external R/W controller 10 to write it on the external recording medium 12. This processing allows data to be continued across medium exchange, even if the user exchanges the external recording medium 12 before it becomes full. Whether or not the above processing is performed may be specified, for example, by an instruction from the user.

The image recording control system of this embodiment operates as described above. In most cases, that is, when the external recording medium 12 has free space, coded data is recorded on it. When the free space is too insufficient to contain picture data to be recorded next, subsequent coded picture data is stored in the internal memory 24.

In this embodiment, the recording time on the external recording medium 12 is not constant because of variable-length coding. This sometimes fills the external recording medium 12 to capacity before a desired image data is recorded. In such a case, a conventional system forces image recording to terminate. This embodiment allows image data to be recorded even after the external recording medium 12 becomes full.

In addition, the image recording system of this embodiment enables the user continuously record image data on a plurality of external recording media. To do so, the user merely exchanges the external recording medium 12 when it becomes full. Image data generated while the user is exchanging the medium is stored in the internal memory 24. After the medium is exchanged, data from the internal memory 24 is recorded on the medium followed by data generated after the medium is exchanged. Thus, image data is recorded seamlessly on two external recording media 12 continuously. Thus, the present invention makes the image recording system easier to use.

Because the internal memory 24 is small in the configuration of this embodiment, data may be written into the internal memory 24 at a constant, low rate. To do so, the determination module 30 sends the write enable signal to the internal memory 24 and, at the same time, a control signal to the variable length coding module 6. In response to the control signal, the variable length coding module 6 generate a small amount of code at a fixed rate, which lengthens the recording time of the internal memory 24.

In this embodiment, the controller 28 detects that the amount of data on the external recording medium 12 has reached the medium capacity. This is done by the controller 28 comparing the amount of free space on the medium sent from the write data amount management module 26 with the amount of coded picture data to be recorded next. Whether data is to be written on the external medium or in the internal memory depends on the comparison result. This may also be done by the external R/W controller 10 checking the amount of free space on the external recording medium 12.

The initial capacity value of the external recording medium 12 may be specified by the user or may be set up based on information from the external recording medium.

Embodiment 2

The configuration of this embodiment is similar to that of the first embodiment shown in FIG. 2. However, in this embodiment, the determination module 30 controls the internal R/W controller 22 in a different manner from that of the first embodiment. In this embodiment, the determination module 30 compares the amount of free space on the external recording medium, received from the write data amount management module 26, with the amount of picture code received from the variable length coding module 6. Based on the comparison result, the determination module 30 sends the control signal to the internal R/W controller 22 as follows:

(1) When the amount of coded picture data to be recorded next is less than the amount of free space on the medium (usual recording time):

The determination module 30 outputs the "update signal" to the internal R/W controller 22. In response to this signal, the internal R/W controller 22 writes sequentially-entered coded data into the internal memory 24. When the internal memory 24 becomes full, new coded data overlays the oldest coded data, sequentially updating the contents of the internal memory 24.

(2) When the amount of coded picture data to be recorded next is larger than the amount of free space on the medium:

The determination module 30 sends the "hold signal" to the internal R/W controller 22. Even after the internal R/W controller 22 receives the hold signal, it continues writing coded data into the internal memory 24. However, the internal R/W controller 22 stops the write operation on the internal memory 24 immediately after the internal memory 24 becomes full with the entered coded data after input of the hold signal.

Figure 5:
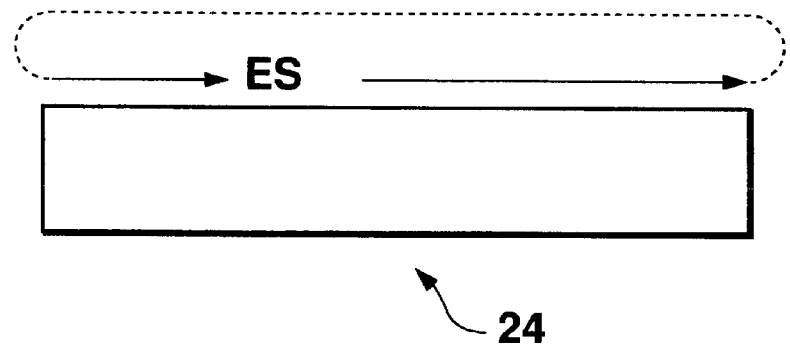
FIG. 5 is a diagram showing how coded data is held in an internal memory in a second embodiment.

FIG. 5 shows how data is written into the internal memory 24. Assume that coded data is written in the point S of the internal memory 24 when the hold signal is received. Subsequent image data is written as shown by the arrow until data is written to the point E where writing stops. If, before data is written in the point E, a stop instruction is received from the user or the medium is exchanged, writing is controlled as in the first embodiment.

The image recording system of this embodiment operates similarly to the image recording system of the first embodiment. In most cases, that is, when the external recording medium 12 has free space, coded data is written there. In response to the update signal, the internal R/W controller 22 keeps updating the contents of the internal memory 24 with sequentially-entered new coded data. When the free space on the external recording medium 12 becomes insufficient, the write enable signal is sent to the external R/W controller 10 and the hold signal to the internal R/W controller 22. The hold signals prevent the contents of the internal memory 24 from being updated with sequentially-entered data.

Coded data stored in the internal memory 24 is sent to the external recording medium 12 as in the first embodiment. The contents of the internal memory 24 are retained until the transposition signal is sent to the internal R/W controller 22. Upon receiving the transposition signal, the internal R/W controller 22 reads coded data following the point S in FIG. 5 (that is, coded data received after the hold signal is received). When data transposition is ended, the internal R/W controller 22 resumes usual operation, writing coded data into the internal memory 24 while updating old data with new data.

If the user removes the external recording medium 12 before it becomes full while continuing shooting, the image recording system operates as follows. When the user removes the medium, the determination module 30 sends the hold signal, instead of the update signal, to the internal R/W controller 22. This signal causes the internal R/W controller 22 to hold coded data written after the medium is removed. When the external recording medium 12 is installed again, coded data is sent from the internal memory 24 to the external recording medium 12.

As described above, this embodiment prevents image data recording from being forced to terminate as in the first embodiment.

Embodiment 3

Unlike the write operation in the first and second embodiments, coded data is written first in the internal memory and then on the external medium in this embodiment. Data in the internal memory is overwritten by sequentially-entered new data. Coded data is sent from the internal memory to the external recording media on an FIFO basis.

Figure 6:
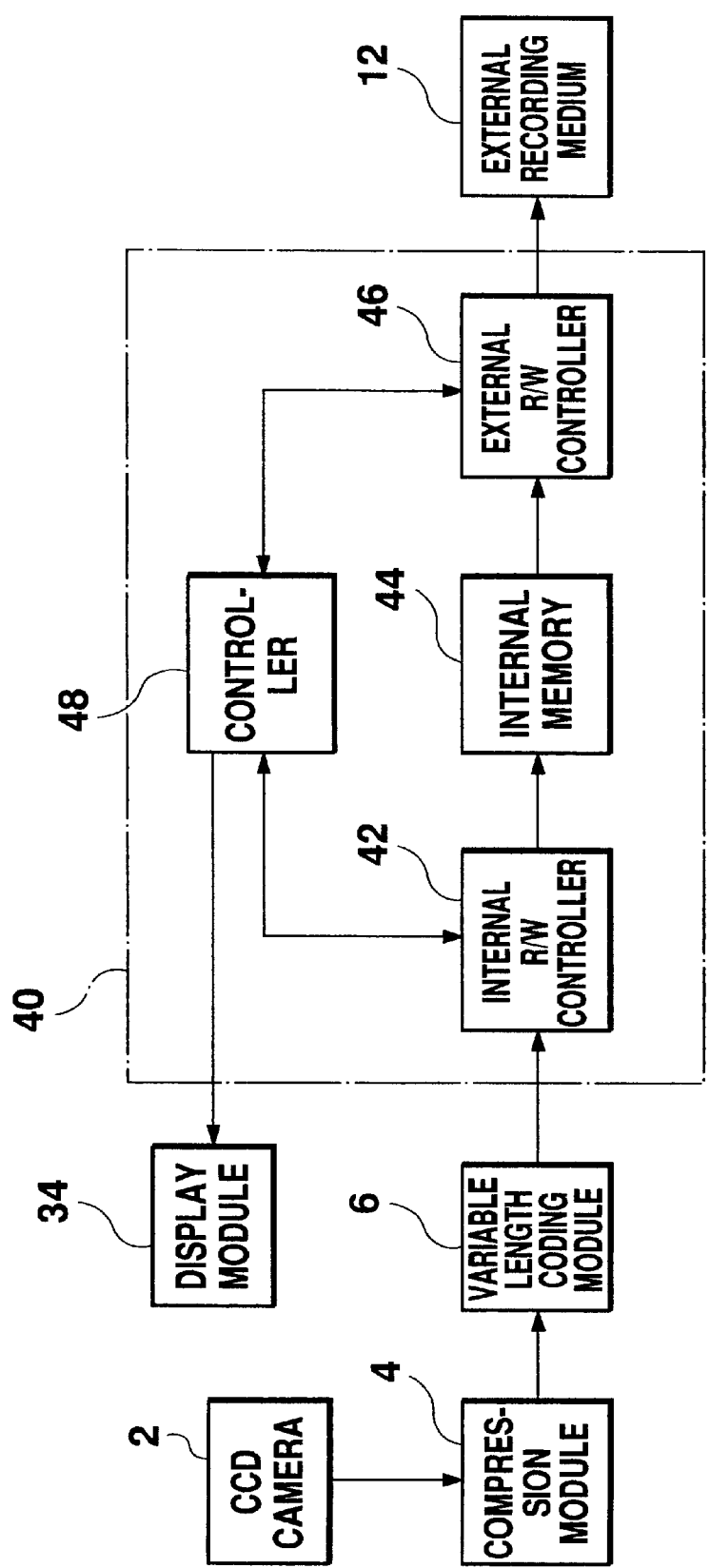
FIG. 6 is a diagram showing the configuration of an image recording system used in a third embodiment.

FIG. 6 shows the configuration of an image recording system with an image recording control system 40 of this embodiment. The same numbers are used for components in this figure corresponding to those in FIG. 2. The following describes mainly the differences of components from those in FIG. 2.

In this embodiment, the variable length coding module 6 outputs coded data only to an internal R/W controller 42. The internal R/W controller 42 writes received coded data into an internal memory 44. From the internal memory 44, coded data is sent to an external R/W controller 46 on an FIFO basis. The external R/W controller 46 writes received coded data to the external recording medium 12. The internal R/W controller 42 and the external R/W controller 46 are controlled by a controller 48.

An image recording control system 40 shown in FIG. 6 operates as follows. Usually, coded data is written in the internal memory 44. The external R/W controller 46 receives coded data from the internal memory 44 on a FIFO basis, and writes it on the external recording medium 12.

The controller 48 monitors the amount of free space on the external recording medium 12 based on the information from the external R/W controller 46. When the amount of free space becomes less than the size of the internal memory 44, the controller 48 displays a warning message on the display module 34 saying that the free space is getting low. This warning message indicates that an amount of data equal to the amount of free space on the external recording medium 12 has already been entered into the image recording control system 40.

Even after this warning message is displayed, the internal R/W controller 42 and the external R/W controller 46 continue writing data into the internal memory 44 and on the external recording medium 12, respectively. The controller 48 checks if the amount of free space on the external recording medium 12 is larger than the amount of the next coded data to be output from the internal memory 44. If the amount of data to be output next is larger than the amount of free space on the external recording medium 12, the controller 48 sends the write disable signal to the external R/W controller 46 and to the internal R/W controller 42. These signals cause the external R/W controller 46 and the internal R/W controller 42 to stop writing data. In this state, both the external recording medium 12 and the internal memory 44 are full.

Assuming that the user stops shooting after the warning message is displayed and before the write disable signal is issued and that the variable length coding module 6 has terminated coding, all coded data is output from the internal memory 44 to the external recording medium 12. When the external recording medium 12 is exchanged, coded data is output from the internal memory 44 and is written on the external recording medium 12 that has been exchanged.

To the user, the image recording system of this embodiment operates the same way as the image recording system of the first and the second embodiments. That is, when the amount of free space becomes less than the storage size of the internal memory 44, a warning message is displayed on the display module 34. As described above, this warning message indicates that an amount of data that fills the external recording medium 12 to capacity has already been entered into the image recording control system 40. If the internal memory 44 is not provided, the external recording medium 12 would have no free space at this time and image recording would stop. However, the image recording system of this embodiment continues image recording even after this message is displayed, thus enabling an amount of image data equal to the size of the internal memory 44 to be recorded on the external medium.

As in the first and second embodiments, this embodiment prevents image data recording from being interrupted before desired image data is recorded.

In the above description, preferred embodiments of this invention were described.

In each of the above embodiments, the amount of free space on the external recording medium 12 is checked for each picture. Any unit of data may be used instead of a picture. For example, a GOP (Group of Pictures) used in MPEG may be used.

In each of the above embodiments, the image recording system contains the CCD camera 2. The image recording system need not always contain a camera (Video signals are sent directly to the image recording system).

The system in each of the above embodiments is an apparatus such as a digital camera which records MPEG-conforming moving data. This invention may also be applied to an apparatus which records still image data, such as a JPEG-conforming digital camera. When still image data is coded into variable-length data by a digital camera, the number of shots depends on the coding rate. Thus, the number of shots may be less than that expected by the user. However, according to the camera, to which the present invention is applied, a further single shot or a plurality of shots may be possible.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A method for controlling storage of data on a removable external recording medium which can be installed on a storage system, comprising the steps of:

(a) determining an amount of variable length data to be stored next;

(b) comparing an amount of free space on said external recording medium with the amount of data to be stored next determined at said step (a);

(c) storing said data to be stored next on said external recording medium when it is determined that the amount of free space is greater than the amount of said data as a result of comparison at said step (b); and (d) halting data storage to said external recording medium and storing said data to be stored next on an internal storage means when it is determined that the amount of free space is less than the amount of said data as a result of comparison at said step (b), wherein when said external recording medium is exchanged from a first external recording medium to a second external recording medium, data held in said internal storage means is stored on said second external recording medium;

on said second external recording medium, data stored in said internal storage means is stored first and then data entered after said second external recording medium is installed is stored; and data is written on said second external recording medium at a rate higher than a rate at which data to be stored is generated until the writing of data on said second external recording medium catches up with generation of said data.

2. A method for controlling storage of data according to claim 1, wherein data in said internal storage means is updated by sequentially-entered data and wherein, when the amount of data stored on said external recording medium has reached a predetermined amount, data which follows data stored on said external recording medium is held in said internal storage means.

3. A method for controlling storage of data on a removable external recording medium which can be installed on a storage system wherein, when said external recording medium is removed during continuous generation of data to be stored, data which follows data stored on said external recording medium is held in an internal storage means;

when a second external recording medium is installed, data which is held in said internal storage means and which is entered after a first external recording medium is removed is stored in said second external recording medium;

on said second external recording medium, data stored in said internal storage means is stored before data entered after said second external recording medium is installed is stored; and data is written on said second external recording medium at a rate higher than a rate at which data to be stored is generated until the writing of data on said second external recording medium catches up with generation of said data.

4. A data storage system comprising:

an encoder for coding entered data into variable length data;

an external storage controller which stores the variable length data generated at said encoder on a removable external recording medium which can be installed on said storage system;

an internal storage controller which stores the variable length data generated at said encoder in an internal storage means on an auxiliary basis; and a main controller which controls said external storage controller and said internal storage controller, said main controller is stopping writing the data on said external recording medium and holding data, which follows data stored on said external recording medium, in said internal storage means when judgment is made not to store the variable length data generated at said encoder on said external recording medium; wherein said encoder includes means for determining an amount of variable length data to be stored next, output by said encoder;

said main controller includes a comparator which compares an amount of free space on said external recording medium with the amount of said variable length data to be stored next;

said main controller stores said variable length data to be stored next on said external recording medium when it is judged that the amount of the free space is greater than the amount of the data to be stored next based on the result at the comparator; and said main controller stores said variable length data to be stored next in said internal storage means when the amount of free space is judged insufficient, and wherein when said external recording medium is exchanged from a first external recording medium to a second external recording medium, data held in said internal storage means is stored on said second external recording medium;

on said second external recording medium, data stored in said internal storage means is stored first and then data entered after said second external recording medium is installed is stored; and data is written on said second external recording medium at a rate higher than a rate at which data to be stored is generated until the writing of data on said second external recording medium catches up with generation of said data.

5. A method for controlling storage of data on a removable external recording medium which can be installed on a storage system, comprising the steps of:

(a) determining an amount of variable length data to be stored next;

(b) comparing an amount of free space on said external recording medium with the amount of data to be stored next determined at said step (a);

(c) storing said data to be stored next on said external recording medium when it is determined that the amount of free space is greater than the amount of said data as a result of comparison at said step (b); and (d) halting data storage to said external recording medium and storing said data to be stored next on an internal storage means when it is determined that the amount of free space is less than the amount of said data as a result of comparison at said step (b), wherein when said external recording medium is exchanged from a first external recording medium to a second external recording medium, data held in said internal storage means is stored on said second external recording medium;

data entered after said second external recording medium is installed is stored first on said second external recording medium before data held in said internal storage means is stored on said second external recording medium; and data is written on said second external recording medium at a rate higher than a rate at which data to be stored is generated until the writing of data on said second external recording medium catches up with generation of said data.

6. The method for controlling storage of data according to claim 5, wherein data in said internal storage means is updated by sequentially-entered data and wherein, when the amount of data stored on said external recording medium has reached a predetermined amount, data which follows data stored on said external recording medium is held in said internal storage means.

7. A data storage system comprising:

an encoder for coding entered data into variable length data;

an external storage controller which stores the variable length data generated at said encoder on a removable external recording medium which can be installed on said storage system;

an internal storage controller which stores the variable length data generated at said encoder in an internal storage means on an auxiliary basis; and a main controller which controls said external storage controller and said internal storage controller, said main controller is stopping writing the data on said external recording medium and holding data, which follows data stored on said external recording medium, in said internal storage means when judgment is made not to store the variable length data generated at said encoder on said external recording medium; wherein said encoder includes means for determining an amount of variable length data to be stored next, output by said encoder;

said main controller includes a comparator which compares an amount of free space on said external recording medium with the amount of said variable length data to be stored next;

said main controller stores said variable length data to be stored next on said external recording medium when it is judged that the amount of the free space is greater than the amount of the data to be stored next based on the result at the comparator; and said main controller stores said variable length data to be stored next in said internal storage means when the amount of free space is judged insufficient, and wherein when said external recording medium is exchanged from a first external recording medium to a second external recording medium, data held in said internal storage means is stored on said second external recording medium;

data entered after said second external recording medium is installed is stored first on said second external recording medium before data held in said internal storage means is stored on said second external recording medium; and data is written on said second external recording medium at a rate higher than a rate at which data to be stored is generated until the writing of data on said second external recording medium catches up with generation of said data.

8. A method for controlling storage of data on a removable external recording medium which can be installed on a storage system wherein, when said external recording medium is removed during continuous generation of data to be stored, data which follows data stored on said external recording medium is held in an internal storage means;

when a second external recording medium is installed, data which is held in said internal storage means and which is entered after a first external recording medium is removed is stored in said second external recording medium;

data entered after said second external recording medium is installed is stored first on said second external recording medium before data held in said internal storage means is stored on said second external recording medium; and data is written on said second external recording medium at a rate higher than a rate at which data to be stored is generated until the writing of data on said second external recording medium catches up with generation of said data.

* * * * *